ANDREW W. DUNLEVY.
Combined Planter and Cultivator.
No. 120,507. Patented Oct. 31, 1871.
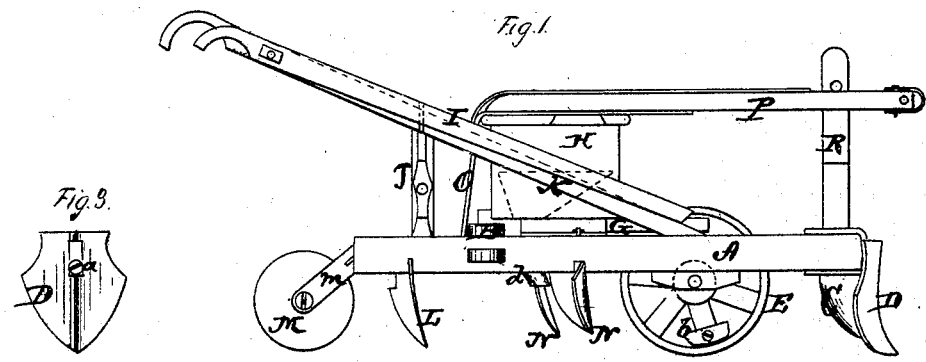
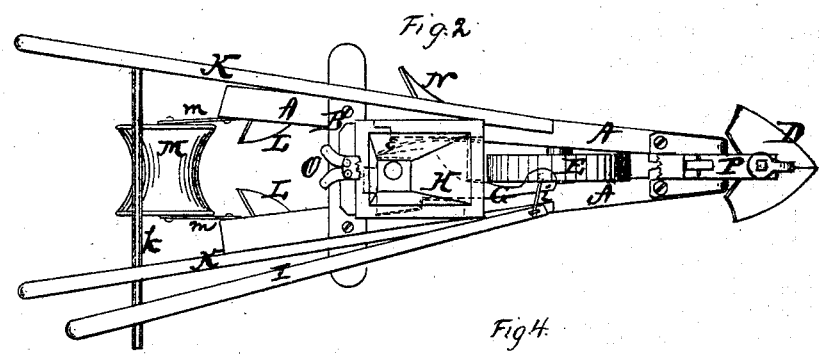
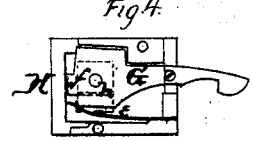
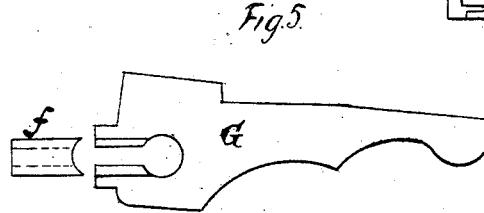
Witnesses
Jas. E. Hutchinson
C. L. Evert
Inventor
Andrew W. Dunlevy

United States Patent Office.

ANDREW WILSON DUNLEVY, OF FAIR PLAY, OHIO.

IMPROVEMENT IN WALKING-PLANTERS.

Specification forming part of Letters Patent No. 120,507, dated October 31, 1871.

*To all whom it may concern:*

Be it known that I, ANDREW WILSON DUNLEVY, of Fair Play, in the county of Jefferson and in the State of Ohio, have invented certain new and useful Improvements in Corn-Planter and Cultivator; and do hereby declare that the following is a full, clear, and exact description thereof, reference being had to the accompanying drawing and to the letters of reference marked thereon making a part of this specification.

The nature of my invention consists in the construction and arrangement of a corn-planter and cultivator, as will be hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 is a plan view of my machine. Fig. 3 is a front view of the front plow. Fig. 4 is a bottom view of the corn-box, and Fig. 5 is an enlarged plan view of the dropping-lever.

A A represent two beams connected together at their front ends, and held any suitable distance apart at or near their rear ends by a cross-bar, B, thus forming a V-shaped or rather an A-shaped frame for supporting the various parts of my machine. Under the front end of the frame A is a cast-iron plow-shaped front, C, which may be either stationary or adjustable, and to which is attached an adjustable shovel, D, having a vertical slot with a set-screw, *a*, through the same for fastening it, so that the shovel may be raised or lowered at will so as to leave a pressure on the wheel behind it. E represents a wheel placed in the frame A, and which follows in the furrow made by the shovel D. This wheel is provided with six arms, upon each of which may be placed a jog or block, *b*. These jogs or blocks may be placed upon said arms in any desired manner so as to drop the corn any desired distance apart. In the revolution of the wheel the jogs or blocks *b* operate upon a lever, G, in the bottom of the box H. In the bottom of the box H is an aperture, with a conductor, *d*, underneath for conveying the corn into the furrow. Upon one side of the lever G, within the box H, is a spring, *e*, which throws the lever back after it has been moved by the jogs on the wheel. In the lever is an aperture with a slide, *f*, to make said aperture larger or smaller to regulate the amount of corn to be dropped, and in the side of the aperture of the box bottom is a piece of rubber, *h*, to prevent any more corn than what is contained in the lever to be dropped.

In cross-planting, so as to work both ways, the jogs or blocks *b* are taken off and a lever, I, pivoted on the side of a standard, J, which supports one of the handles K. The front end of this lever is, by a cord, *i*, connected with the front end of the lever G, and the rear end is guided by means of the rod *k*, which connects the handles, passing through an aperture in the same. L L are half-shovels, to throw in the dirt which the front plow or shovel D throws out, leaving it in a nice cone or V-shaped ridge. M is a concave roller, hung in bars *m m* from the rear ends of the beams A A. This roller follows the shovels L L, so that if the ground is too loose the roller will press it, leaving a trench at each side of the cone or ridge, which protects the young corn from being covered. Its mode of covering makes it difficult for squirrels, &c., to find the hill.

When desired to use this machine as a cultivator, shovels N N are placed as represented for the first working. When the corn is large, they are placed behind and the shovels L L take their place.

In rear of the box H, to the cross-bar B of the frame, is hinged a metal bar, O, which extends upward and over the box, having the tongue or draft-beam P attached to it. This tongue or draft-beam extends forward, and has a mortise through which passes an upright standard, R, from the front end of the main frame. The team is attached to the front end of the beam P in any suitable manner.

Having thus fully described my invention, what I claim as new, and desire to secure by Letters Patent, is—

The combination of the frame A B with wheel E, shovels N L, front C, adjustable shovel D, hinged bar O, draft-bar P, seed-box H and its operating mechanism, and standard R, all constructed and arranged substantially as and for the purposes herein set forth.

In testimony that I claim the foregoing I have hereunto set my hand this 14th day of August, 1871.

ANDREW W. DUNLEVY.

Witnesses:
 ROBERT ARMSTRONG,
 M. L. BLACKBURN.